United States Patent [19]

Younger

[11] Patent Number: 4,745,855

[45] Date of Patent: May 24, 1988

[54] ELECTRIC TOASTER ELEMENT

[75] Inventor: William H. Younger, Victoria, Australia

[73] Assignee: Sunbeam Corporation, Downers Grove, Ill.

[21] Appl. No.: 14,320

[22] Filed: Feb. 13, 1987

[30] Foreign Application Priority Data

Feb. 13, 1986 [AU] Australia ............................ PH4593
Jul. 7, 1986 [AU] Australia ............................ PH6805

[51] Int. Cl.$^4$ ........................ A47J 37/08; H05B 3/06
[52] U.S. Cl. ........................................ 99/391; 99/401; 99/385; 219/521
[58] Field of Search ................. 99/391, 389, 392, 401, 99/329 R, 329 RT, 385; 219/521, 537

[56] References Cited

U.S. PATENT DOCUMENTS

| 2,847,931 | 8/1958 | Saint ............................. 99/389 |
| 3,363,089 | 1/1968 | Snyder ........................ 99/391 X |
| 3,529,538 | 9/1970 | Ottinger ....................... 99/389 |
| 4,038,520 | 7/1977 | Boller et al. .................. 99/389 X |
| 4,396,825 | 8/1983 | Cox et al. .................... 99/389 X |

FOREIGN PATENT DOCUMENTS

| 3035712 | 4/1982 | Fed. Rep. of Germany ........ 99/401 |
| 2084840 | 4/1982 | United Kingdom ................. 99/389 |

Primary Examiner—James Kee Chi
Attorney, Agent, or Firm—Neil M. Rose

[57] ABSTRACT

An electric heating element assembly for a bread toaster having a resistance element disposed in a tortuous configuration on a plate of insulating material and having a heat conducting, electrically insulating sheet secured in parallel relation to said plate to sandwich said element against said plate. The heating element being mounted in a toaster in closer proximity to the bread slice position than the elements of a conventional toaster.

8 Claims, 8 Drawing Sheets

ELECTRIC TOASTER ELEMENT

This invention relates to electric toasters, and more particularly to heater element assemblies therefor.

These assemblies usually comprise a heater element commonly referred to as an element card, to one side of which is affixed a bread guide, serving to radiate heat to one side of a bread slice. The card, in the case of a lateral heater element for a toaster, consists of a micanite plate, or former, carrying an electrically resistive element exposed over one face of the plate, and over both faces in the case of an inner card. The bread guide is affixed to the card with a grating spaced from the exposed element to ensure against contact with the element by either the bread or a user's finger. As a result of this spacing the element must radiate more heat than would otherwise be necessary, and provision must be made within the appliance for withstanding such a degree of heat. This provision increases the cost of production.

It is the main object of the invention to provide an improved form of heater element assembly which will permit achievement of a more efficient and/or appealing electric toaster.

In accordance with the invention there is provided an electrical heater element card assembly for an electric toaster comprising a flat electrically insulating former, an electrically resistive heating wire wound on the former to expose the heater winding on at least a first face thereof, a heat conducting electrically insulating sheet overlying said first face to form a laminate, and a metal bread guide secured to the laminate and including a protective grating positioned in juxtaposition to said insulating sheet.

The invention also provides a substantially rectangular electric toaster having a casing with side walls and at least one longitudinally extending entry slot in its top for food slices to be toasted, and two electrical heater element card assemblies within said casing and laterally disposed to said slot for the toasting of a food slice inserted into said slot, each of said heater card assemblies comprising a flat electrically insulating former, an electrically resistive heating wire wound on the former to expose the heater winding on at least a first face thereof, a heat conducting electrically insulating sheet overlying said first face to form a laminate, and a metal bread guide secured to the laminate and including a protective grating positioned in juxtaposition to said insulating sheet.

The invention will be described in more detail with reference to the accompanying drawings, in which.

Figure 1:
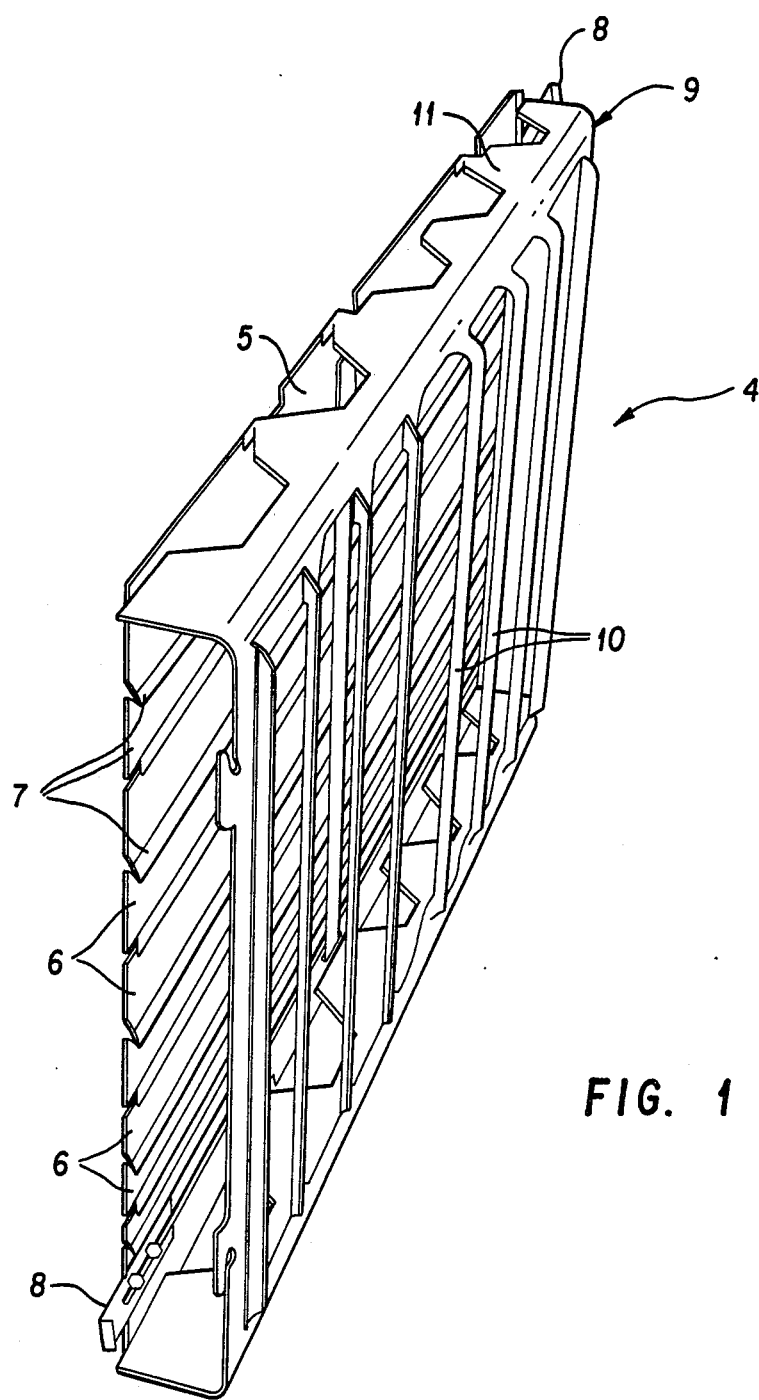
FIG. 1 depicts a conventional form of lateral electrical heater element card assembly.

The conventional form of a lateral, or outer, electrical heater element card assembly 4 shown in FIG. 1 consists of a former 5, usually composed of a micanite board of rectangular shape, provided with lateral lugs 6 over which an electrically resistive heating wire 7 is looped to be exposed on one face only of the former 5. The ends of the wire are secured to top and bottom terminals 8. A bread guide 9 formed with an open grating 10 is folded at its opposite ends to provide legs 11 secured at their feet about the edges of the former 5 to support the grating 10 spaced therefrom. Thus, when the card assembly is mounted within the confines of a toaster casing 35 (FIG. 8) to one side of an entry slot 39 for bread slices, the slices are prevented by the grating 10 (FIG. 1) from coming into contact with the exposed heater winding 7. The bread guide 9 also affords a degree of protection against the insertion of a user's finger into a contacting position with the exposed heater wire 7.

Figure 2:
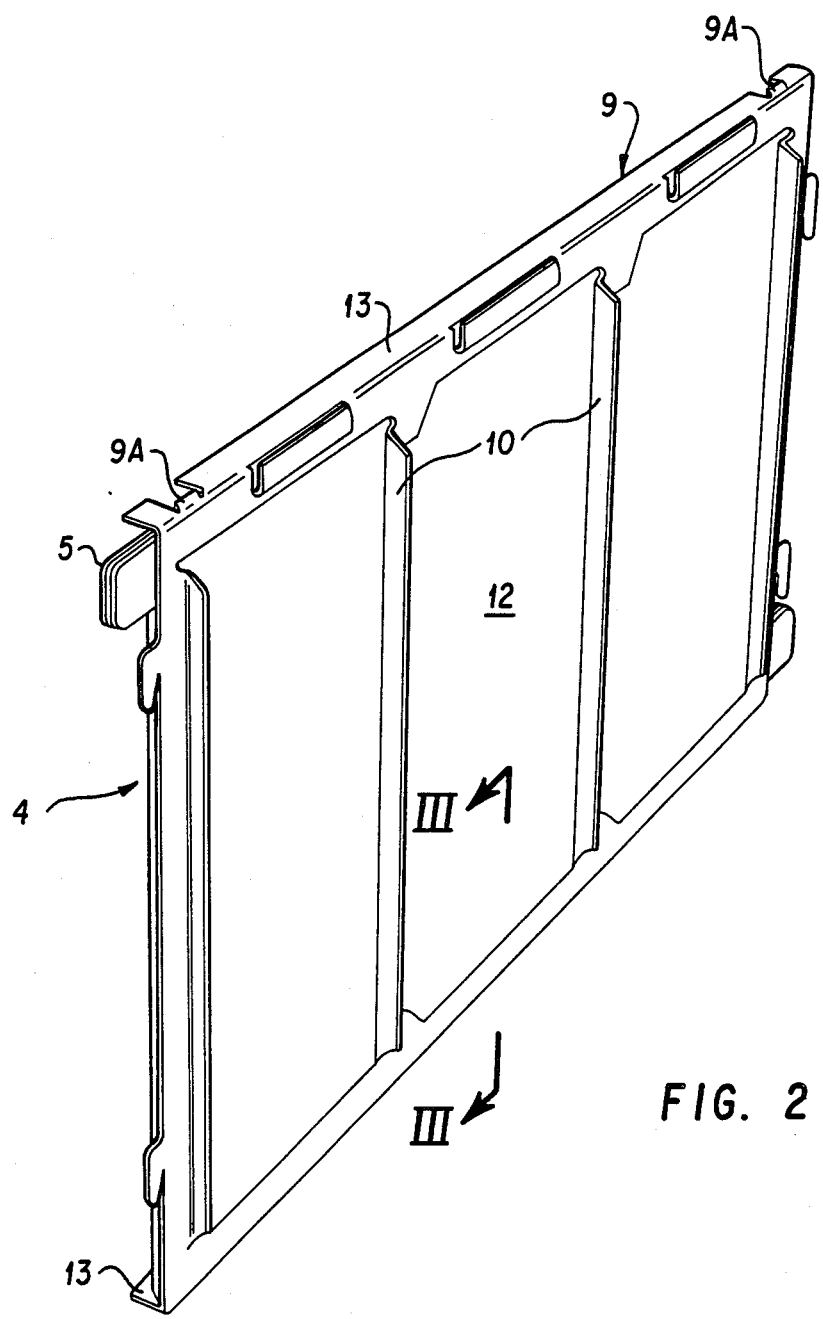
FIG. 2 shows a card assembly constructed according to this invention.
Figure 3:
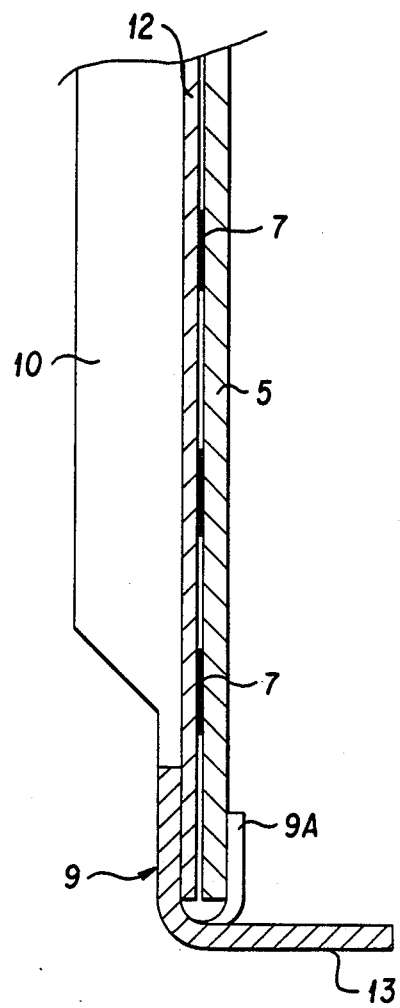
FIG. 3 is a sectional detail on line 3—3 of FIG. 2.

By the invention, and as shown in FIGS. 2 and 3, the card assembly is constructed differently in that a covering sheet 12 is applied over the otherwise exposed heater element wire 7, and the legs 11 of the bread guide 9 are omitted whereby the grating 10 is juxtaposed, i.e. contacting or closely spaced, to the covering sheet 12. Preferably the covering sheet 12 is of micanite and may be retained upon the former 5 by clamping of head and foot portions 13, or tab portions thereof such as tabs 9A, at opposite ends of the bread guide 9, about the laminate formed by the sheet 12, the element wire 7 and the former 5.

Figure 4:
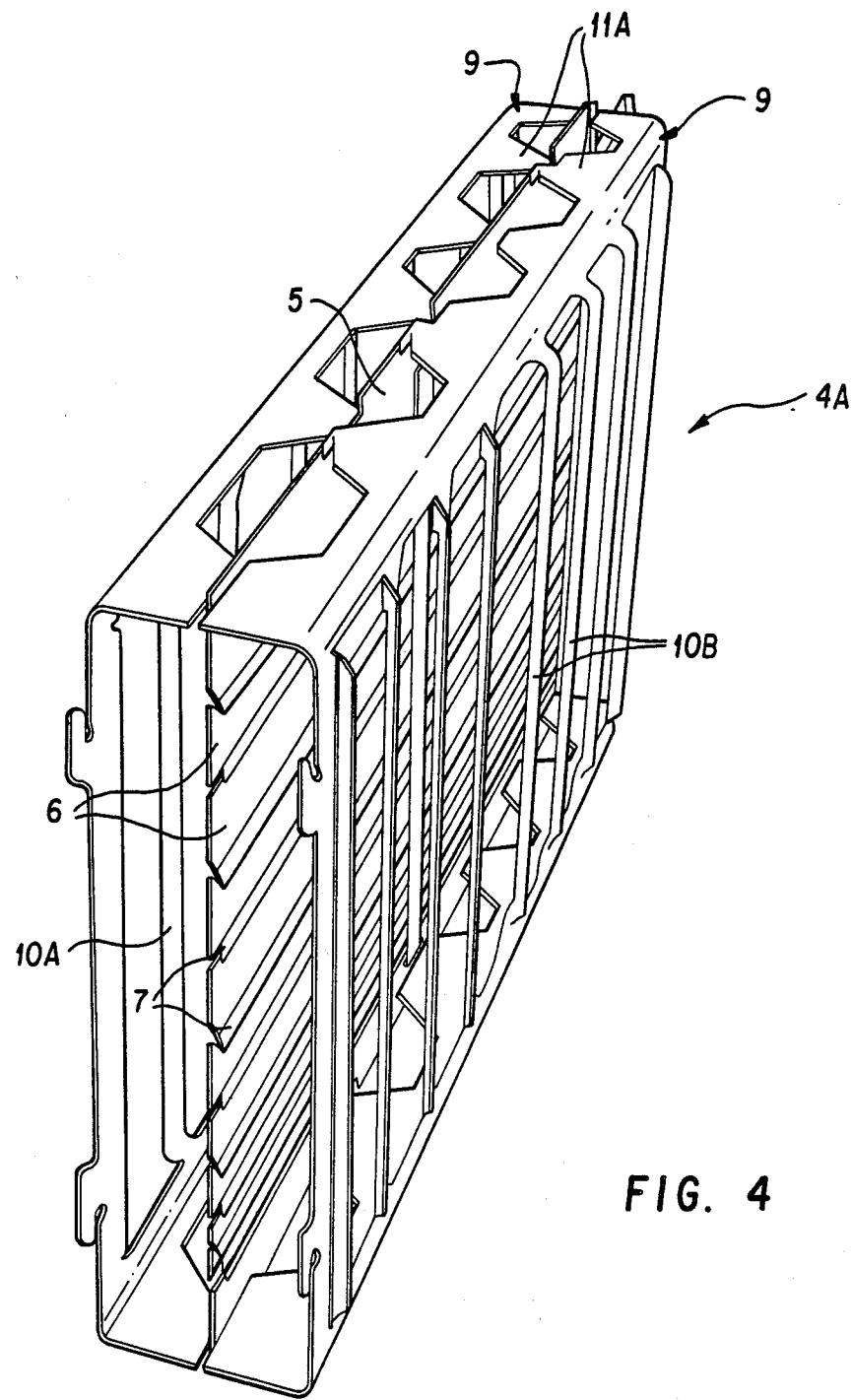
FIGS. 4, 5 and 6 are similar views as FIGS. 1 to 3 but of a part heater element card assembly.

The construction of a conventional central, or inner, electrical heater element card assembly 4A is shown in FIG. 4 which comprises a micanite former 5 with lugs 6 between which the heater wire 7 is threaded to be exposed on both faces of the former 5. Bread guides 9 and 9 having open gratings 10A and 10B are bent at their opposite ends into support legs 11A which are clipped in position at their distal ends upon a marginal edge portion of the former 5.

Figure 5:
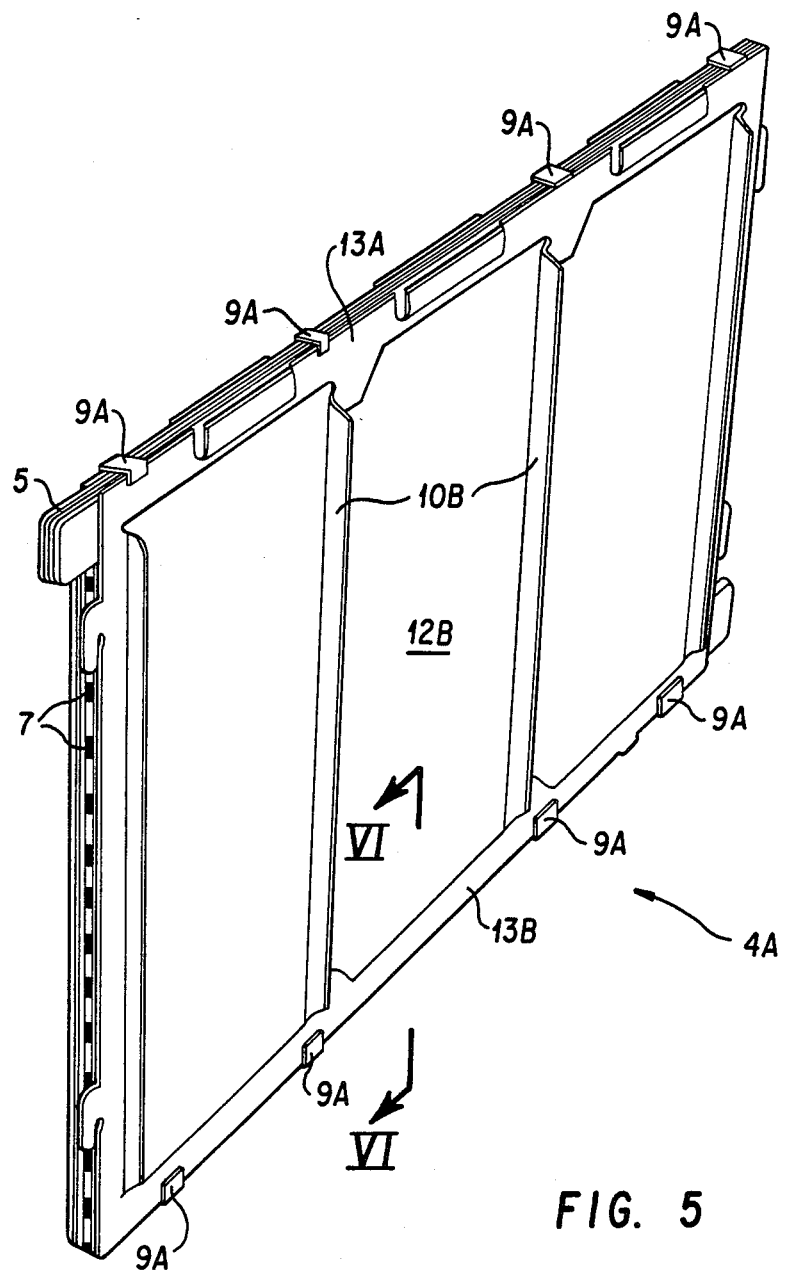
Figure 6:
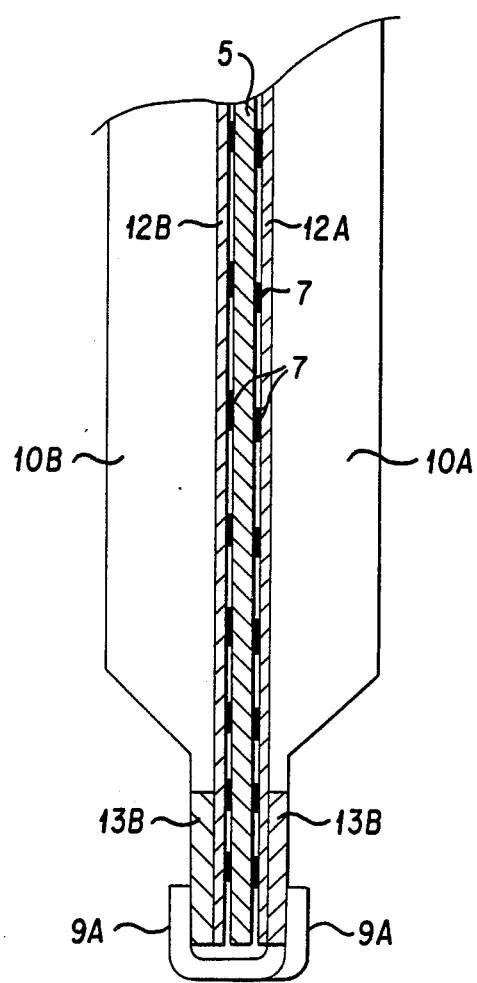

In the case of the heater card assembly shown in FIGS. 5 and 6 it differs from that of FIGS. 2 and 3 in that two covering micanite sheets 12A and 12B are applied over the opposite faces of the former 5 to cover the heater wire 7 which is exposed on both faces. Clamping together is effected by folding over of the tabs 9A at each of the head and the foot portions 13A and 13B of the bread guides 9. It will be noted that each of the two bread guides 9 are of identical construction. A heat shield plate 38 to protect the casing 35 is preferably incorporated.

Requirements, in respect of conventional inner and outer card assemblies, are usually set by Government Standards Authorities which provide, for safety reasons, a minimum spacing of the gratings 10 from the heater wire 7, say of 6 mm. The assembly of the heater cards 4 and 4A, of FIGS. 2 and 3, and of FIGS. 5 and 6, show that the spacing of the gratings 10 from the heater wires 7 is considerably reduced from which results lower wattage required in the heater wires 7 without any loss of safety.

Figure 7:
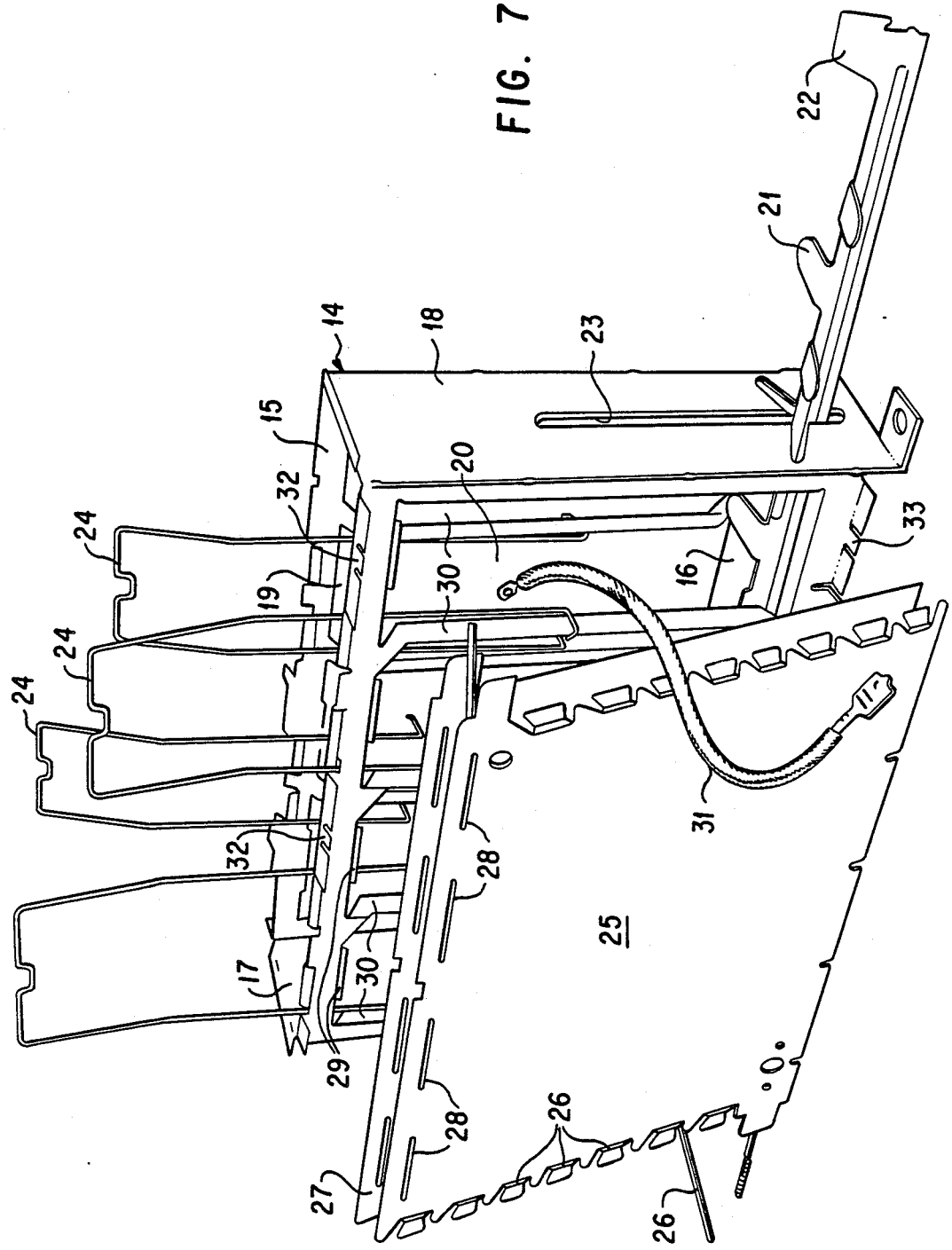
FIG. 7 shows in perspective the central chassis of an electric toaster upon which a heater card of this invention is in the process of being assembled.

FIG. 7 depicts a part chassis 14 of an electric toaster which is generally of box form open at its top 15 and bottom 16, with closed ends 17 and 18 and open sides 19 and 20. A bread carrier 21, shown partly withdrawn from the chassis 14 is displaceable between the top 15 and bottom 16 of the chassis 14, for lowering and raising bread slices for toasting, with its operating lever 22 slidable along the slot 23 in the end wall 18. The walls of the chassis 14 define a toasting station therein for bread slices lowered between opposite pairs of guide frames 24.

A former 25, composed of a micanite board of rectangular shape, with ane electrically resistive heating wire 26 wound thereon, and exposed on one face only of the former 25 being that face in the drawing concealed from the viewer, is placed a juxtaposition to a micanite sheet 27 to cover the exposed heater winding 26. Corresponding slots 28 are provided near the top ends of both the former 25 and the covering sheet 27 through which lugs 29, projecting from the wall 20 of the chassis 14 are entered to support the electrical heater element card for assembly upon the chassis 14.

It will be noted that bread guides 30 for the heater element card are provided by integral, spaced metal strands in the side wall 20 remaining after the punching operation. These guides 30 are bent inwardly out of the plane of the wall 20 to be disposed at right angles to the former 25 and cover sheet 27 when applied to the chassis 14. They are juxtaposed to the covering sheet 27 to provide for close proximity of the former 25 and its heating wire 26 to bread slices lowered by the carrier 21 into the toasting station defined by the chassis 14. An electrical power lead 31 provides for connection of energising power to the heater wire 26.

For retaining the assembly of the heater element card upon the chassis 14 distal lugs 32 and 33 are provided at the top and bottom of the wall 20 for folding over the top and bottom edge of the former 25. One face of the covering sheet 27 is, therefore, in contact with the side wall 20 of the chassis 14 enabling close spacing of the heating wire 26 to the toasting station.

As toasting simultaneously on both sides of a slice of bread will be desired, the construction of the opposite side wall 19 and assembly thereon of another heater element card assembly will be similar to that already described.

Where the heater element card assembly is to serve as a central heater to juxtaposed toasting stations, two chassis 14 will be utilized together with two laterally disposed heater element card assemblies and a single central heater. A suitable manner of assembly of the components is to fix the lateral heaters firstly to their respective chassis 14 and to position the chassis with the lateral elements outermost in juxtaposition one upon the other with the central heater between them and upon the lugs 29. The entire assembly is then secured by folding the distal lugs 32 and 33 of one chassis 14 over the edge of another. As an alternative the lateral heaters may be assembled upon their chassis in a different sequence.

In the development of an electric toaster according to the invention it was found that due to the closer proximity of a bread slice for toasting to the heater card assemblies smaller inclinations of the bread slice from parallel alignment with the assemblies, than in the case of a conventional toaster, was likely to result in non-uniform colour spread of browning over the bread faces. Furthermore, loss of toasting colour balance between the opposite faces of the bread slice was more likely to result from non-centring of the bread slice between its heater card assemblies. Therefore, to achieve good quality even browning of a slice of toast, or a crumpet or the like, a form of self centring means has been incorporated. This means is embodied in guide frames which are pairs of frames fixed at their bottom ends and lightly urged together at their top ends by springs (not shown) or guide frames 24 shown in FIGS. 7 and 8 which are pivoted at their tops and sprung together at their bottom ends.

Despite the inclusion of the frames 24 the toaster has been capable of accommodating bread slices at least one third closer to their heater card assemblies than is conventional. For example, a satisfactory toaster has been produced with a spacing between heater element cards of 30.5 mm with the gratings 10 of the bread guides 30 each 3 mm thick so that a maximum thickness of 24.5 mm of food slice for toasting is provided. The guide frames 24 are also 3 mm thick but being interspersed with the gratings 10. When operating they lie juxtaposed to the gratings 10 and do not extend into the intervening space between the guides 30. Thus, as most food slices for toasting vary between 24.5 and 8 mm, the spacing between either face of a bread slice and the confronting heater card assembly will be from 3 mm to 11 mm. However, it is possible to use a 1 mm wire frame for both the gratings 10 and the guide frames 24 so that the spacing may be reduced to as little as 1 mm. Furthermore, with 3 mm thick gratings 10 and a very thin bread slice of say 4 mm a maximum spacing of 13 mm will exist. In allowing for a 6 mm standards spacing requirement as referred to above and the usual 3 mm thickness of the gratings 10, this bread spacing in a conventional toaster is from 9–22 mm, depending on the thickness of the food slice.

Figure 8:
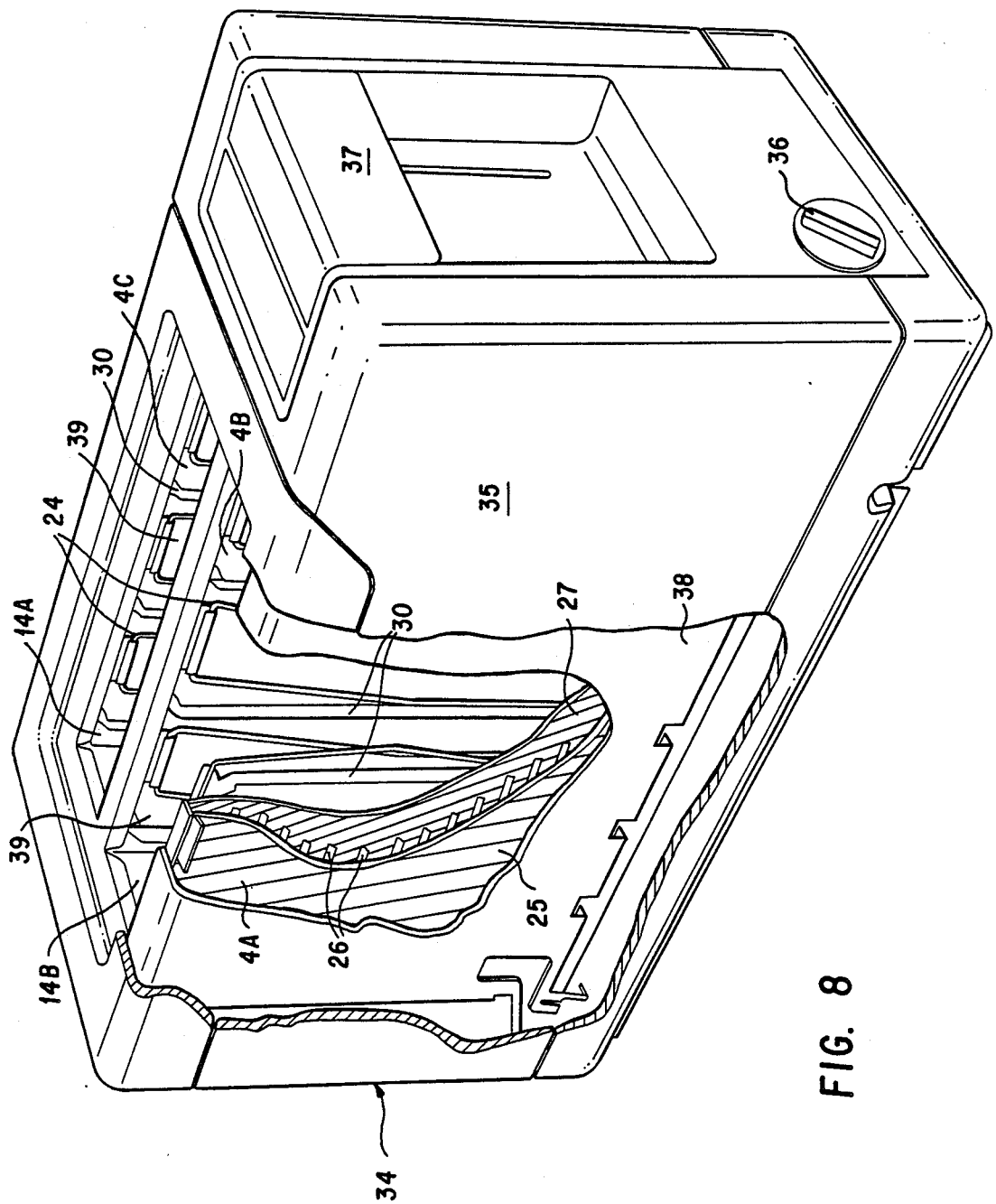
FIG. 8 shows in partial section an electric toaster incorporating card assemblies constructed according to the invention.

An electric toaster 34, shown in FIG. 8, which incorporates heater element card assemblies 4A, 4B and 4C constructed according to this invention is subject to new design criteria as a result of lower operating temperatures within its casing 35. The toaster 34 is provided with two juxtaposed toasting stations and, therefore, includes two of the box form chassis 14 shown in FIG. 7 and like numerals serve to identify like parts to those shown in that drawing. The central heater element card assembly 4B will be constructed as shown in FIGS. 5 and 6 while the assemblies 4A and 4C correspond to the outer card assemblies of FIGS. 2 and 3. A rotatable finger control 36 serves to determine the degree of toasting required, and the lever handle 37 is attached to the operating lever 22 (FIG. 7) for lowering of bread slices into the toasting stations when the lever 22 is depressed. It will be appreciated that bread slices for toasting will now be permitted to be positioned much closer to the heater elements 7, i.e. well within present safety spacing restrictions imposed, which will enable a lower wattage to be used for toasting due to reduced heat loss between the heaters and the bread slice. Furthermore, the element wires 7 are less vulnerable to damage as a result of the protection afforded by the cover sheet 12. An important advantage from the use of lower operating temperatures is that lower-temperature materials may be utilised both in the leadwires and plastic materials used in the construction of the appliance. Whereas, conventional electric toasters are provided with metal casings 35 sometimes with enclosing plastics end panels an attractive slim-line toaster design is possible wherein the entire casing 35 is composed of thermoplastic material.

An electric toaster constructed as described above with reference to FIG. 8 has been tested in operation to ascertain its performance relative to a similar capacity electric toaster of conventional design, i.e. having heater element card assemblies 4 and 4A as shown in FIGS. 1 and 4. The latter appliance was connected directly to 240 V AC mains supply and the former connected to the same supply voltage through a Variac (a variable power supply device). The two appliances were supplied with bread slices within their toasting stations and were switched on, and subsequently off, simultaneously. Empirically by repeated operations, allowing on each occasion for both appliances to cool down completely, and adjustment of the Variao devioe it was observed that toast of a similar degree of browning was obtained with the heaters of the conventional toaster operating at 1050 W and the heaters of the toaster of this invention operating at 850 W.

Preferred embodiments have been described in the foregoing passages but it should be clearly understood that other forms, modifications and refinements are feasible within the scope of this invention.

Whereas principally the construction of an outer, or lateral, heater element card assembly has been described it should be understood that the invention is also applicable to the central card assembly as utilised in a side-by-side toaster. In that instance the heater wire 7 is exposed on both faces of the former 5. By the invention a separate covering sheet 12 is applied over both exposed faces.

The claims defining the invention are as follows:

I claim:

1. An electrical heater element card assembly for an electric toaster comprising a flat electrically insulating former, an electrically resistive heating wire wound on the former to expose the heater winding on at least a first face thereof, a heat conducting electrically insulating sheet overlying said first face to form a laminate, and a metal bread guide secured to the laminate and including a protective grating positioned in juxtaposition to said insulating sheet.

2. An electrical heater element card assembly as claimed in claim 1, wherein said heating wire is wound to be exposed on both faces of said former, individual ones of said insulating sheets overly both said faces of said former, and individual ones of said metal bread guides are secured to opposite faces of said laminate.

3. An electrical heater element card assembly as claimed in claim 1 or 2, wherein the protective grating of each said metal bread guide is in contact with said insulating sheet.

4. A substantially rectangular electrical toaster having a casing with side walls and at least one longitudinally extending entry slot in its top for food slices to be toasted, and two electrical heater element card assemblies within said casing and laterally disposed to said slot for the toasting of a food slice inserted into said slot, each of said heater card assemblies comprising a flat electrically insulating former, an electrically resistive heating wire wound on the former to expose the heater winding on at least a first face thereof, a heat conducting electrically insulating sheet overlying said first face to form a laminate, and a metal bread guide secured to the laminate and including a protective grating positioned in juxtaposition to said insulating sheet.

5. An electric toaster as claimed in claim 4, wherein each of said heater card assemblies is spaced 1 mm to 13 mm from a food slice of from 24.5 mm to 4 mm thickness whenever inserted into said slot.

6. An electric toaster as claimed in claim 5, wherein said card assemblies are spaced substantially 8 mm from said food slice.

7. An electric toaster as claimed in any one of claims 4 to 6, further comprising centring means within or adjacent said slot for engagement with a food slice inserted into said slot to urge said food slice into parallel alignment with said heater element card assemblies and midway therebetween.

8. An electric toaster as claimed in any one of claims 4 to 6 further comprising centring means within or adjacent said slot for engagement with a food slice inserted into said slot to urge said food slice into parallel alignment with said heater element card assemblies and midway therebetween, said centring means being movable guide frames disposed at opposite sides of said slot.

* * * * *